United States Patent
Tapie et al.

(10) Patent No.: US 10,012,073 B2
(45) Date of Patent: Jul. 3, 2018

(54) INITIATOR DEVICE FOR A DOWNHOLE TOOL

(75) Inventors: William Robert Tapie, Conroe, TX (US); Lianhe Guo, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 400 days.

(21) Appl. No.: 14/401,905

(22) PCT Filed: Jun. 10, 2012

(86) PCT No.: PCT/US2012/041807
§ 371 (c)(1),
(2), (4) Date: Nov. 18, 2014

(87) PCT Pub. No.: WO2013/187855
PCT Pub. Date: Dec. 19, 2013

(65) Prior Publication Data
US 2015/0211359 A1    Jul. 30, 2015

(51) Int. Cl.
*E21B 47/12* (2012.01)
*E21B 47/00* (2012.01)
*G01V 11/00* (2006.01)

(52) U.S. Cl.
CPC ............ *E21B 47/12* (2013.01); *E21B 47/00* (2013.01); *G01V 11/002* (2013.01)

(58) Field of Classification Search
CPC ...... E21B 47/12; E21B 43/1185; E21B 47/00; G01V 11/002
See application file for complete search history.

(56) References Cited

U.S. PATENT DOCUMENTS

| | | | | | |
|---|---|---|---|---|---|
| 3,550,695 | A | * | 12/1970 | Shore | E21B 43/119 175/4.51 |
| 3,596,582 | A | * | 8/1971 | Sayer | G03B 37/005 396/19 |
| 3,901,313 | A | * | 8/1975 | Doniguian | E21B 33/068 166/64 |
| 4,202,225 | A | * | 5/1980 | Sheldon | E21B 19/20 173/164 |
| 5,176,164 | A | * | 1/1993 | Boyle | E21B 34/06 137/155 |
| 5,339,898 | A | * | 8/1994 | Yu | E21B 43/305 166/248 |
| 5,959,547 | A | * | 9/1999 | Tubel | E21B 23/03 166/372 |
| 6,028,408 | A | * | 2/2000 | Grass | B60S 1/08 318/443 |

(Continued)

OTHER PUBLICATIONS

Discovery House, Australia Government IP Australia, Patent Examination Report No. 1, Patent Application No. 2012382436; which is an AU counterpart to the instant application, dated Oct. 29, 2015.

(Continued)

*Primary Examiner* — Daniel P Stephenson
(74) *Attorney, Agent, or Firm* — Howard L. Speight, PLLC

(57) ABSTRACT

A method of initiating a process in a downhole tool includes connecting a downhole tool to an initiator device that contains wires capable of creating a loopback and/or loaded condition when a closed connection is made. The initiator device is further capable of indicating successful initiation.

19 Claims, 3 Drawing Sheets

(56) References Cited

U.S. PATENT DOCUMENTS

| | | | | | |
|---|---|---|---|---|---|
| 6,055,213 | A * | 4/2000 | Rubbo | | E21B 41/00 |
| | | | | | 175/40 |
| 6,130,610 | A * | 10/2000 | Schilsky | | G08B 13/00 |
| | | | | | 340/539.14 |
| 6,148,263 | A * | 11/2000 | Brooks | | G05B 23/0256 |
| | | | | | 702/6 |
| 7,123,160 | B2 * | 10/2006 | Hall | | E21B 47/12 |
| | | | | | 166/250.01 |
| 7,347,278 | B2 * | 3/2008 | Lerche | | E21B 41/00 |
| | | | | | 102/215 |
| 2008/0115575 | A1 | 5/2008 | Meek et al. | | |
| 2010/0212882 | A1 * | 8/2010 | Guven | | E21B 23/04 |
| | | | | | 166/65.1 |
| 2010/0230105 | A1 * | 9/2010 | Vaynshteyn | | E21B 47/04 |
| | | | | | 166/297 |
| 2010/0268470 | A1 * | 10/2010 | Kamal | | G01V 11/00 |
| | | | | | 702/13 |
| 2012/0152530 | A1 * | 6/2012 | Wiedecke | | E21B 19/07 |
| | | | | | 166/250.01 |
| 2012/0168174 | A1 * | 7/2012 | Vaghi | | E21B 34/16 |
| | | | | | 166/373 |
| 2014/0005834 | A1 * | 1/2014 | Hoffman | | G05B 19/042 |
| | | | | | 700/275 |
| 2014/0311803 | A1 * | 10/2014 | Bittar | | E21B 47/0002 |
| | | | | | 175/45 |
| 2015/0211359 | A1 * | 7/2015 | Tapie | | E21B 47/00 |
| | | | | | 166/250.01 |

OTHER PUBLICATIONS

International Preliminary Report on Patentability, dated Jul. 10, 2014, PCT/US12/41807, which is the parent PCT application of the instant application.

International Search Report and The Written Opinion of the International Searching Authority, or the Declaration, dated Aug. 3, 2012, PCT/US2012/41807, which is the parent PCT application of the instant application.

Canadian Intellectual Property Office, Application No. 2,870,717, Examiner's requisition, which is CA counterpart to the instant application, dated Nov. 24, 2015.

Australian Government IP Australia, Patent Examination Report No. 2, Patent Application No. 2012382436, which is an AU counterpart to the instant application; dated Aug. 5, 2016.

Australian Government IP Australia, Patent Examination Report No. 3, Patent Application No. 2012382439, which is an AU counterpart to the instant application; dated Oct. 28, 2016.

Innovation, Science and Economic Development Canada, Notice of allowance, Application No. 2,870,717, which is a CA counterpart to the instant application, dated Aug. 29, 2016.

* cited by examiner

INITIATOR DEVICE FOR A DOWNHOLE TOOL

CROSS-REFERENCE TO RELATED APPLICATIONS

Not applicable.

FIELD

The present invention generally relates to means of initiating downhole tools that are used in a subterranean well.

BACKGROUND

Autonomous downhole tools used in subterranean wells are frequently programmed using a surface system computer prior to being integrated into a tool string and sent downhole. The surface system can initiate processes in the tool, for example the initiation of a countdown, in which operations of the tools begin after a time delay. However, communication between the surface system and the tool is often not possible during a period of time prior to integration and until after the tool is lowered into the hole. Certain tools, such as tubing conveyed, slick-line, logging while drilling (LWD), and measurement while drilling (MWD) tools may not have a wired connection to the surface system and can only be communicated to through mud pulse telemetry, which may not be possible until the tool is sufficiently integrated into the downhole tool assembly. In some cases, no communication between the surface system and the tool is possible during the entire job while the tool is integrated in the downhole assembly.

Once the programming is initiated, tools that do not have a connection to the surface may be expected to run autonomously for a duration of the job or for the entire job. At times it is desirable to have one or more processes within the tool start at a specified time prior to integrating the tool into the tool string without the use of a surface system. For instance, the surface system may be located far from the area of tool string integration, yet it is not desirable to initiate a process in the tool until the tool has been moved into the integration area. Furthermore, the time between removing the tool from the surface system and integrating the tool into the tool string may not be known in advance. In cases where the initiation of a process in a tool begins a countdown, it is desirable to be able to initiate the process at a chosen time prior to tool string integration.

Initiating a process within a downhole tool often involves using a power source, such as a surface system computer. Often, weather conditions and/or the safety risks associated with certain oil field rig zone areas, such as Zone 2 rig environments, can make the use of electric power sources dangerous. In such cases, it is desirable to initiate a process in a downhole tool without the use of electrical power.

When downhole tools are initiated using a surface system, it can be difficult to determine whether initiation was successful. Some tools produce a faint sound or vibration to indicate that a process has been initiated, which indications may be difficult for workers to detect in muddy, rainy, and/or noisy oil field environments.

A need exists for a simple means of initiating a process in an autonomous downhole tool that addresses the issues discussed above.

DETAILED DESCRIPTION

The invention includes a method of initiating a process in a downhole tool and for an initiator device.

In an embodiment, the invention is a method of initiating a process in a downhole tool. Specifically, the invention is for initiating a process in a downhole tool, while the tool is located at the surface, after a tool has been disconnected from a surface system but prior to its deployment and/or integration into a tool string. The process to be initiated can be any process for which the tool has been preprogrammed, such as the start of a countdown. "Initiation" is to be understood as distinct from the "activation" or "setting" of a downhole tool, wherein the tool begins to perform its primary operation. For example, in a perforating gun, initiation may refer to the initiation of a process according to the gun's computer programming, while activation may refer to performing the perforation.

The method of initiating a process in a downhole tool includes creating a loopback and/or loaded condition across signal lines in an initiator device and detecting the condition to initiate a process according to the tools' programming. The method can further include indicating successful initiation with an indicator on the initiator device.

Figure 1:
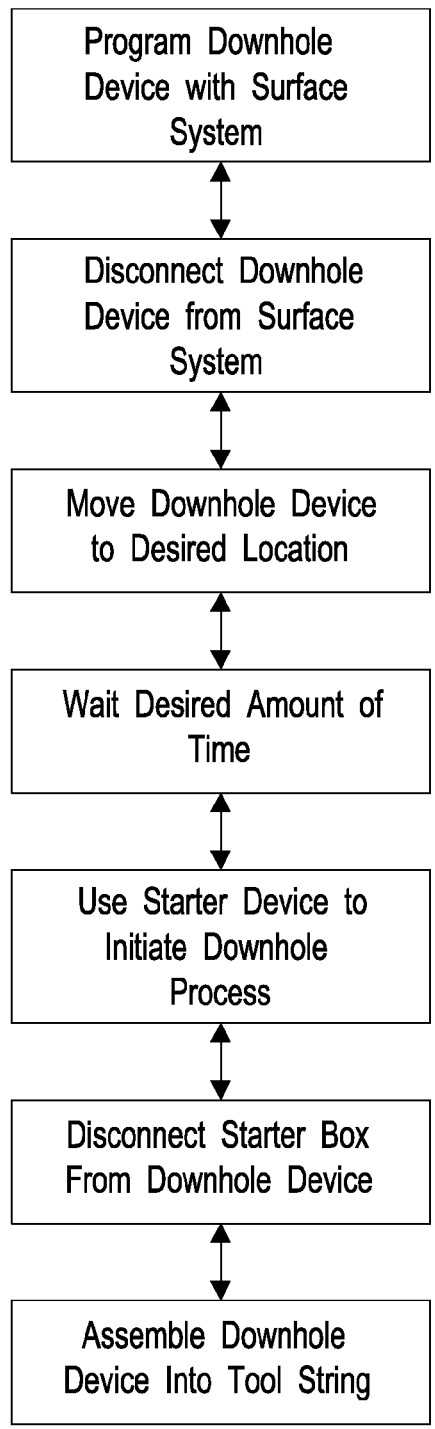
FIG. 1 is a chart of an example job flow for initiating a process in a downhole tool.

FIG. 1 is a chart of an example job flow, describing the steps of initiating a process in a downhole tool. The downhole tool is connected to the surface system and programmed with job specific parameters. Upon completion of programming, the tool is disconnected from the surface system and moved to the integration area. The tool remains in the integration area until the rig crew is ready to integrate it into the tool string. Just prior to integration, the rig crew connects the initiator device to the tool and actuates the actuator according to a predetermined sequence. Once the device indicates the tool process has been successfully initiated, the crew disconnects the device from the tool and proceeds with integrating the tool into the tool string.

In an embodiment, the invention is for an initiator device to be used with a downhole tool. The initiator device includes wires that are capable of connecting to the tool signal lines. A downhole tool can be preprogrammed to constantly send out a signal. When the wires in the initiator devices are connected, and once a closed circuit is created, the signals travel across the wires of the initiator device and return to the downhole tool. The closed connection can create a loopback condition and/or a loaded condition, which can initiate a process in the tool according to the tool's programming. For a loaded condition, the signal lines of the initiator device may include load impedance made up of a combination of resistive and/or reactive components. The load impedance can be made up of discrete components and/or distributed components. For instance, the load can be a potentiometer.

In an embodiment, the initiator device also includes an actuator. When actuated, the actuator creates a closed connection between the wires and permits the receiving and transmitting of signals. The actuator can be a switch, and can be any type of switch, including sliding switches, button switches, toggle switches, membrane switches, slider switches, keypad switches, wheel switch, lever switches, and the like.

In an embodiment, the initiator device does not include an actuator. The loopback and/or loaded condition is always set or hardwired.

In an embodiment, the initiator device further includes an indicator, which can indicate successful initiation of the tool. The indicator can be connected to the transmit line(s) of the tool during a loopback or load state. The indicator can employ visual, motion, and/or sound indication to communicate the state of the tool. The indicator can be chosen from digital displays, LEDs, buzzers, speakers, vibration motors, and the like. For example, an LED may be connected to the tool transmit line(s), and the rate at which the LED blinks is set by the characteristics of the signal being looped back. For instance, the connection may start with a slow blinking of the LED light, which can increase in frequency to a rapid blink once the tool communicates successful initiation of the desired process in the tool.

In an embodiment, the initiator device does not contain any power source. Often, weather conditions and/or the safety risks associated with certain oil field rig zone areas, such as Zone 2 rig environments, can make the use of power sources dangerous. In such cases, it is desirable to initiate a process in a downhole tool without the use of electrical power that could possibly be an ignition source.

Figure 2A:
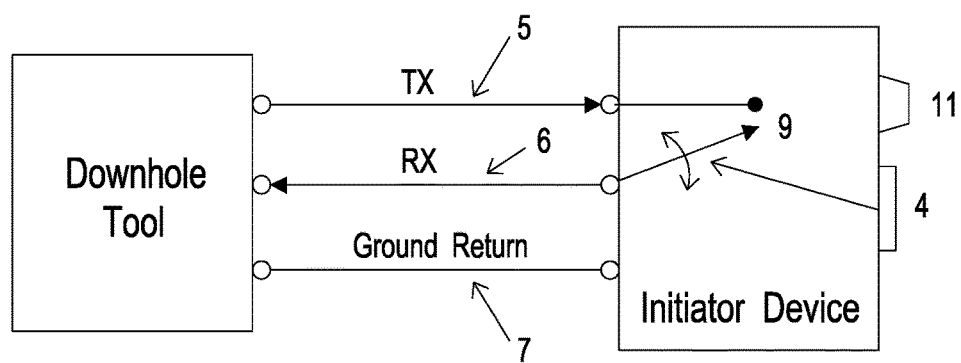
FIG. 2a-b shows two examples of the initiator device's configuration.
Figure 2B:
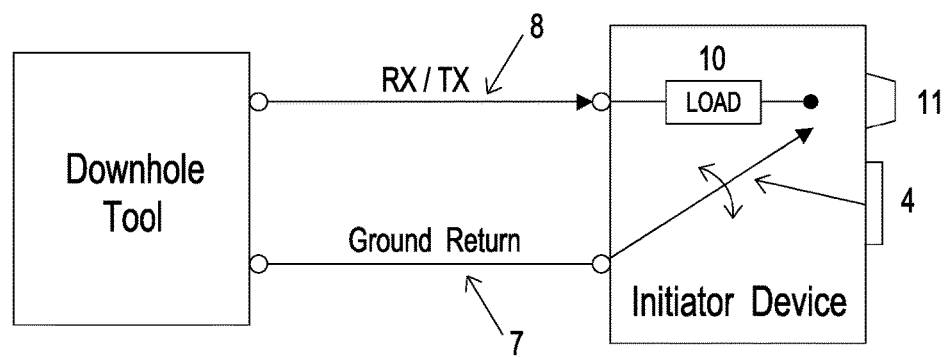

FIGS. 2A and 2B are diagrams showing two possible embodiments of the initiator device and the downhole tool. The downhole tool (1) has, at minimum, a connection to the communication signals used by the surface system to program the tool. Other signals may be provided by the tool and may or may not be used by the initiator device. In the configuration shown in FIG. 2A, the transmit (5) and receive (6) signals are communicated over the same signal lines, and a loopback scheme (9) is used within the initiator device (2). A loopback condition is created by actuating the actuator (4) on the initiator device (2) in a predetermined sequence. The indicator (11) will change states based on the state of the downhole tool. The ground return (7) may or may not be used for the loopback scheme.

In the configuration shown in FIG. 2B shows the case where receive and transmit signals are communicated over the same signal line (8). A predetermined load (10), made of resistive and reactive components in a discrete or distributed manner, is applied between the signal line (8) and ground return (7) by actuating the actuator (4) in a predetermined sequence. The indicator (11), will change states based on the state of the downhole tool.

The loaded line (10) scheme can also be applied to the separate transmit line (5) of Configuration A in combination with the loopback scheme (9) or as a standalone approach.

The initiator device can be used in any known drilling environment, and is especially useful in drilling environments that include extreme forms of weather or that have safety risks associated with certain oil field rig zone areas, such as Zone 2 rig environments.

The initiator device can be used with any known downhole tool, including by non-limiting examples: perforating guns, MWD and LWD tools.

While compositions and methods are described in terms of "comprising," "containing," or "including" various components or steps, the compositions and methods can also "consist essentially of" or "consist of" the various components and steps. Use of the term "optionally" with respect to any element of a claim is intended to mean that the subject element is required, or alternatively, is not required. Both alternatives are intended to be within the scope of the claim.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A method for initiating a process in a downhole tool, comprising:
connecting the downhole tool, the downhole tool having signal lines, to an initiator device, the initiator device having an actuator, when the downhole tool is at the surface and before the downhole tool is integrated into a tool string, wherein connecting the initiator device to the signal lines creates a closable circuit among the signal lines and wherein the initiator device closes the closeable circuit without the use of electrical power to cause the closeable circuit to close;
and using the actuator to create a sequence of signal conditions across the signal lines, wherein the sequence of signal conditions is predefined to initiate a process in the tool;
wherein the sequence of signal conditions includes a loopback condition wherein the loopback condition comprises the initiator device directly connecting a TX output of the downhole tool to an RX input of the downhole tool.

2. The method of claim 1, wherein the sequence of signal conditions includes a loaded condition wherein the loaded condition comprises the initiator device connecting a TX output of the downhole tool to an RX input of the downhole tool through a load.

3. The method of claim 1 further comprising indicating the signal condition on an indicator on the initiator device.

4. An initiator device for use when a downhole tool is at the surface and before the downhole tool is integrated into a tool string, the downhole tool comprising signal lines capable of communicating a sequence of signal conditions to initiate a process in the downhole tool, wherein the initiator device is connectable to the signal lines to close a circuit among the signal lines, wherein the initiator device closes the circuit without the use of electrical power to cause the circuit to close, wherein the sequence of signal conditions includes a loopback condition.

5. The device of claim 4, further comprising an actuator.

6. The device of claim 5, wherein the actuator is a switch chosen from button switches, toggle switches, membrane switches, slider switches, keypad switches, wheel switches, and lever switches.

7. The device of claim 4, wherein the loopback condition is created across a closed connection of transmit line(s) of the tool to receive line(s) of the tool.

8. The device of claim 7, wherein an actuator is used to close the connection.

9. The device of claim 4, wherein the sequence of signal conditions includes a loaded condition.

10. The device of claim 9, wherein the loaded condition is created across a closed connection of transmit line(s) of the tool to a ground return line of the tool through a load.

11. The device of claim 10, wherein an actuator is used to close the connection.

12. The device of claim 9, wherein the load comprises at least one of resistive elements and reactive elements.

13. The device of claim 9, wherein the load comprises at least one of discrete components and distributed components.

14. The device of claim 9, wherein the load is a potentiometer.

15. The device of claim 4 further comprising an indicator connected to the transmit line(s) of the tool, wherein the indicator indicates creation of a signal condition.

16. The device of claim 15, wherein the indicator emits light.

17. The device of claim 16, wherein the indicator is an LED.

18. The device of claim 15, wherein the indicator emits sound.

19. The device of claim 15, wherein the indicator emits motion.

* * * * *